United States Patent
Gayout et al.

(10) Patent No.: US 8,934,078 B2
(45) Date of Patent: Jan. 13, 2015

(54) MULTIPLE GLAZING WITH VARIABLE SCATTERING BY LIQUID CRYSTALS AND ITS METHOD OF MANUFACTURE

(75) Inventors: Patrick Gayout, Villemomble (FR); René Poix, Noyon (FR); Elodie Bouny, Gueret (FR); Jingwei Zhang, Massy (FR)

(73) Assignee: Cardinal IG Company, Eden Prairie, MN (US)

( * ) Notice: Subject to any disclaimer, the term of this patent is extended or adjusted under 35 U.S.C. 154(b) by 85 days.

(21) Appl. No.: 13/820,467

(22) PCT Filed: Aug. 31, 2011

(86) PCT No.: PCT/FR2011/051990
§ 371 (c)(1),
(2), (4) Date: May 15, 2013

(87) PCT Pub. No.: WO2012/028823
PCT Pub. Date: Mar. 8, 2012

(65) Prior Publication Data
US 2013/0229612 A1    Sep. 5, 2013

(30) Foreign Application Priority Data

Sep. 3, 2010 (FR) ...................................... 10 57005

(51) Int. Cl.
*G02F 1/1333* (2006.01)
*B32B 37/14* (2006.01)
(Continued)

(52) U.S. Cl.
CPC ...................... *B32B 17/10165* (2013.01); *G02F 2001/133302* (2013.01); *B32B 37/14* (2013.01);
(Continued)

(58) Field of Classification Search
USPC .................................................. 349/193, 201
See application file for complete search history.

(56) References Cited

U.S. PATENT DOCUMENTS

| | | | |
|---|---|---|---|
| 3,963,324 A | 6/1976 | Fergason et al. | |
| 5,691,795 A | 11/1997 | Doane et al. | |

(Continued)

FOREIGN PATENT DOCUMENTS

| | | |
|---|---|---|
| CN | 101 694 555 | 4/2010 |
| EP | 2128688 A1 | 12/2009 |

(Continued)

OTHER PUBLICATIONS

International Search Report as issued for International Application No. PCT/FR2011/051990, dated Dec. 9, 2011.

*Primary Examiner* — Phu Vu
(74) *Attorney, Agent, or Firm* — Fredrikson & Byron, P.A.

(57) ABSTRACT

A multiple glazing with variable scattering by liquid crystals includes first and second flat float glass sheets sealed on the edge of their internal faces by a sealing joint, in particular made of a given sealing material, in particular essentially organic, first and second electrodes, and a layer of liquid crystals with an average thickness E between 15 and 60 μm inclusive of these values and incorporating spacers. The thickness A of each of the first and second glass sheets is less than or equal to 5.5 mm, and each of the internal faces coated with the first and second electrodes has a dioptric defect score, expressed in millidioptres, of less than 12E/15 where the thickness E of the liquid crystals is in μm.

14 Claims, 4 Drawing Sheets

(51) Int. Cl.
*G02F 1/1339* (2006.01)
*B32B 17/10* (2006.01)
*E06B 9/24* (2006.01)
*G02F 1/1334* (2006.01)

(52) U.S. Cl.
CPC ....... *G02F 1/1339* (2013.01); *B32B 17/10504* (2013.01); *E06B 9/24* (2013.01); *G02F 1/1334* (2013.01)
USPC .......................................... 349/193; 349/201

(56) References Cited

U.S. PATENT DOCUMENTS

| | | |
|---|---|---|
| 2002/0012160 A1 | 1/2002 | Kase et al. |
| 2004/0160538 A1 | 8/2004 | Li et al. |
| 2010/0105276 A1 | 4/2010 | Yoshida |

FOREIGN PATENT DOCUMENTS

| | | |
|---|---|---|
| WO | WO 92/19695 | 11/1992 |
| WO | WO 98/05998 | 2/1998 |
| WO | WO 98/30653 | 7/1998 |

MULTIPLE GLAZING WITH VARIABLE SCATTERING BY LIQUID CRYSTALS AND ITS METHOD OF MANUFACTURE

CROSS-REFERENCE TO RELATED APPLICATIONS

This application is the U.S. National Stage of PCT/FR2011/051990, filed Aug. 31, 2011, which in turn claims priority to French Application No. 1057005 filed Sep. 3, 2010. The content of these applications are incorporated herein by reference in their entirety.

The invention relates to the field of electrically controllable glazing having variable optical properties, and it more particularly concerns glazing with variable scattering by liquid crystals, provided with a layer of liquid crystals between two glass panes and alternating reversibly between a transparent state and a non-transparent state by application of an alternating electric field.

Glazings are known, certain characteristics of which can be modified under the effect of a suitable electrical supply, more particularly the transmission, absorption, reflection at certain wavelengths of electromagnetic radiation, particularly in the visible and/or infrared ranges, or alternatively the scattering of light.

Electrically controllable glazing with liquid crystals can be used everywhere, both in the construction sector and in the motor vehicle sector wherever viewing through the glazing needs to be prevented at given times.

Document WO 9805998 discloses multiple glazing with liquid crystals, comprising:
- two 1 m² float glass sheets with thicknesses of 6 mm sealed on the edge of their internal faces by an adhesive sealing joint made of epoxy resin,
- two electrodes made of electrically conductive layers based on $SnO_2$:F, directly on the internal faces of the glass panes,
- a 15 µm layer of liquid crystals based on PSCT "Polymer Stabilized Cholesteric Texture" and incorporating spacers in the form of 15 µm glass beads directly on the electrodes.

The glass panes are placed in contact by lowering the second glass pane with an inclined angle onto the first glass pane in order to enclose the layer of liquid crystals, as shown in FIG. 2 and described on page 8.

Subsequently, after formation of the sealing joint, the glass panes are pressed by passing between two rollers in order to distribute the layer of liquid crystals while evacuating the trapped air, as shown in FIG. 3.

The optical performance and the reliability of this glazing can be improved. Furthermore, such glazing is expensive, heavy, bulky and in particular difficult to handle.

It is an object of the invention to develop reliable multiple glazing with liquid crystals, which has satisfactory optical performance and is preferably compact.

To this end, the present invention firstly provides multiple glazing with variable scattering by liquid crystals having:
- first and second flat float glass sheets sealed on the edge of their internal faces by a sealing joint, in particular made of a given sealing material, in particular an essentially organic sealing material,
- on the internal faces of the first and second glass sheets, first and second electrodes in the form of transparent electrically conductive layers provided with a power supply,
- and, on the first and second electrodes, a layer of liquid crystals alternating reversibly between a transparent state and a translucent state by application of an alternating electric field, which layer has an average thickness E of between 15 and 60 µm inclusive of these values and incorporates spacers, in particular transparent spacers.

The thickness A of each of the first and second glass sheets is less than or equal to 5.5 mm, and each of the internal faces coated with the first and second electrodes has a dioptric defect score, expressed in millidioptres (or mdt), of less than 12E/15 where the thickness E of the liquid crystals is in µm.

The Applicant has discovered the relationship between the quality of the glass panes and the optical performance of the multiple glazing with liquid crystals.

Figure 1:
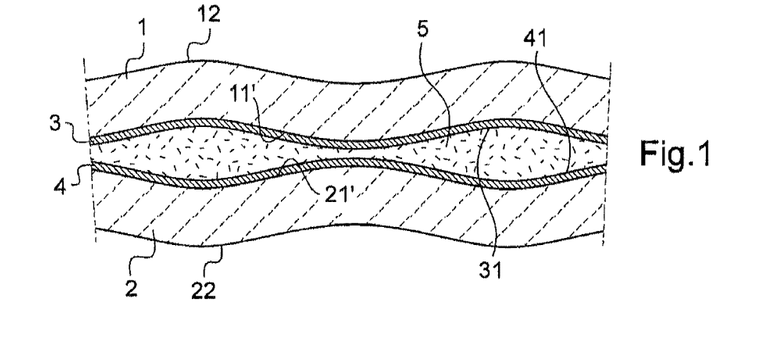
FIG. 1 (already described) represents a schematic sectional view of reference multiple glazing with variable scattering by liquid crystals, not according to the invention.

FIG. 1 shows, as reference glazing, an assembly of two standard thin glass panes 10, 20, for example of 1.7 mm, facing one another and forming a space between them containing a layer of liquid crystals 5 with a thickness of 15 µm. The internal surfaces 11', 21' have planarity defects, and the thickness of the liquid crystals is variable.

In the "off" state (translucent state), the light transmission closely related to the thickness of the layer of liquid crystals is therefore not uniform. The quality of the product is therefore unacceptable, because of the visually observable dark and light regions.

In order to ensure good optical uniformity, the coated glass panes should therefore have limited dioptric defects.

The glass panes according to the invention ensure a sufficiently uniform thickness of the layer of liquid crystals over the entire surface, and therefore little variation in its optical performance. This avoids a glazing reject rate and therefore improves its reliability.

We will define a dioptric defect and a measurement method below.

We can define the profile of the internal face of each glass sheet (coated or not) in question by y(x), where x denotes the position on the internal face. The variation of this profile can be characterized by the optical reflection power ORP, which is defined by the following relationship:

$$ORP_{(x)} = 2\frac{d^2 y_{(x)}}{dx^2} = 2y''_{(x)}$$

The variation of y(x) is due to the two phenomena:
- undulations of the sheet of glass,
- thickness defects (non-parallelism of the 2 faces of the glass sheet).

This quantity is expressed in dioptres (m$^{-1}$) for y(x) expressed in metres.

If the second derivative y"(x) is zero, this means that the internal face of the glass is perfectly flat; if the second derivative is less than 0, this means that the internal face of the glass is concave; and if the second derivative is greater than 0, this signifies that the internal face of the glass is convex.

The method for measuring the planarity y(x) of the internal face of the glass is a contactless optical measurement method, which consists in analysing the contrast at every point of a so-called umbrascopic image obtained by reflection of a homogeneous light source from the internal surface of the glass.

The unmeasured external face of the glass sheet is wetted with a liquid having an index similar to that of the glass, in order to eliminate any reflection of the light from this surface and keep only the image of the directly illuminated internal face.

The planarity is thus measured every millimetre over the illuminated surface of the internal face. Each point is quantified by a physical unit of optical power in millidioptres (mdt=dioptre/1000), similar to converging and diverging lenses.

The final planarity is quantified by a dioptric defect score, which corresponds to the standard deviation of all the measurements. This score, expressed in millidioptres (mdt), perfectly characterizes the planarity of the measured surface. The score increases when the planarity is degraded.

For a given dioptric defect score, the amplitude of the variation of y(x) also depends on the periodicity or pitch.

By way of example, for a sinusoidal profile y(x) with a pitch of 30 mm, a dioptric defect of 10 mdt corresponds to a profile variation of about +/−0.20 µm. In the worst case, the spatial variation of an assembly of two glass sheets (and therefore the thickness variation E of the liquid crystals) is then doubled, i.e. about +/−0.40 µm. For a defect with a pitch of 15 mm, the same 10 mdt dioptric defect corresponds to a profile variation of +/−0.05 µm, and the thickness variation E of the liquid crystals is therefore +/−0.10 µm in the worst case.

The pitch of dioptric defects of a sheet of float glass covers a range of from a few millimetres to a few tens of millimetres. Being closely linked with the uniformity of the thickness E of the liquid crystals, the uniformity of light transmission in the "off" state results from all the dioptric defects with all the pitches.

The uniformity of light transmission in the "off" state is also conditioned by the average thickness E of LC. The greater the thickness E is, the more a thickness variation can be tolerated. This is why, according to the invention, a score is established as a function of the average thickness.

The dioptric defects of float glass are principally linked with the rate of advance of the glass (drawing rate of the line). The greater the glass advance rate is, the greater the dioptric defects are. For a given capacity (or tonnage, daily) and a given raw width of glass, the glass advance rate is inversely proportional to the thickness A of the glass sheet. Therefore, the thinner the glass sheet is, the higher the glass advance rate is and the greater the dioptric defects are.

Thus, it is not possible to use an arbitrary thickness because it is the dioptric quality of the glass which determines the possible thickness of the glass. The invention allows us to select glass panes thinner than 6 mm while guaranteeing the quality of the final product. The invention allows us, for example, to use the smallest possible thickness while guaranteeing the optical quality of the final product. For example, 2 mm glass panes may be selected so long as these glass panes are produced with a drawing rate which is low enough to ensure limitation of dioptric defects.

Furthermore, even with a 6 mm glass pane if the tonnage is too high, for example 2000 tonnes/day, the dioptric defects will be too great.

The electrode in layer(s) has no significant influence on the dioptric defects. Thus, if a "bare" float glass is suitable, the glass coated with an electrode layer will also be suitable.

Naturally, for the sake of simplicity and economy, it is preferable to select suitable float glasses rather than to have to smooth (polishing etc.) any glass obtained by another manufacturing method.

The invention furthermore makes it possible to produce high-performance liquid-crystal multiple glazings with a width of more than 1 m.

In a preferred embodiment, for a thickness E of less than 30 µm, the thickness A of the first glass sheet and the second glass sheet lies between 3 mm and 5.5 mm inclusive of these values, in particular by production on a float line with a capacity of at least 550 tonnes/day and preferably limited to 700 tonnes/day or for a thickness E greater than or equal to 30 µm, the thickness A of the first glass sheet and the second glass sheet lies between 2 mm and 5.5 mm inclusive of these values, in particular by production on a float line with a capacity of at least 550 tonnes/day and preferably limited to 700 tonnes/day.

Furthermore, the sealing joint has a given width L and may preferably be interrupted in its width by a plurality of openings each defining lateral joint ends, and for each opening an additional sealing material forms a bridge between the lateral ends of the joint, in particular consisting of the said sealing material, thus forming material continuity.

In the multiple glazing with liquid crystals of the prior art, the sealing joint is continuous.

With openings—supplemented with additional sealing—according to the invention interrupting the joint of such multiple glazing with liquid crystals, the optical performance (in the off state) is improved by contributing, particularly in the edge regions of the layer of liquid crystals, to uniform distribution of the layer of liquid crystals.

The inventive use of such openings—supplemented with additional sealing—constitutes an invention per se. In a preferred embodiment, however, it is coupled with glass panes as defined above having a limited thickness A and a limited dioptre score.

Furthermore, it is in fact possible to use all the liquid-crystal systems known by the terms "NCAP" (Nematic Curvilinearly Aligned Phases" or "PDLC" (Polymer Dispersed Liquid Crystal) or "CLC" (Cholesteric Liquid Crystal) or "NPD-LCD" (Non-homogenous Polymer Dispersed Liquid Crystal Display).

These may furthermore contain dichroic colourants, particularly in solution in the droplets of liquid crystals. The scattering of light and the absorption of light by the systems can then jointly be modulated.

It is also possible to use, for example, gels based on cholesteric liquid crystals containing a small quantity of crosslinked polymer, such as those described in Patent WO-92/19695. More broadly speaking, "PSCTs" (Polymer Stabilized Cholesteric Texture) may therefore be selected.

Naturally, the liquid-crystal system may extend substantially over the entire surface of the glazing (except for the margins) or over (at least) one restricted region. The liquid-crystal system may be discontinuous, in a plurality of pieces (for example of the pixel type).

Multiple glazing with variable scattering by liquid crystals, as defined above, may be used as glazing in vehicles or buildings.

The glazing according to the invention may be used in particular:
- as an internal partition (between two rooms or in an area) in a building, in a means of land, air or aquatic locomotion (between two compartments, in a taxi, etc.),
- as a glazed door, a window, a ceiling, a tile (floor, ceiling),
- as a rear-view mirror of a vehicle, side glazing, a roof of a means of land, air or aquatic locomotion,
- as a projection screen,
- as a shop frontage, a window in particular of a shop counter.

Naturally, the glazing according to the invention may form all or part of a partition and other window (such as a fanlight etc.), or multiple glazing (with the addition of extra glazing).

The invention also relates to a method for producing multiple glazing with variable scattering by liquid crystals, as defined above, comprising the following steps:

- formation of the sealing joint, comprising application of the sealing material (preferably essentially organic, in particular epoxy resin) on the first float glass sheet (at the border) provided with the first electrode,
- (before or after formation of the sealing joint) liquid deposition of the layer of liquid crystals with an average thickness E on the first float glass sheet provided with the first electrode and optionally on the second float glass sheet provided with the second electrode,
- after formation of the sealing joint and deposition of the layer of liquid crystals, bringing the first and second glass sheets in contact, in particular by calendering or pressing,
- and before bringing the first and second glass sheets in contact, formation of the plurality of the said openings of the sealing joint, each defining lateral joint ends, by discontinuous application of the sealing material and/or by continuous application of the sealing material and the creation of interruptions forming the openings.

At least two openings are preferably positioned facing a first sheet edge (sheet with straight or curved edges) and at least two other openings facing a second edge opposite the first edge, these edges corresponding to the edges of the direction of the calendering, in the case of calendering.

In the case of pressing in particular, at least two openings are also positioned facing a third edge adjacent to the first edge (and to the second edge) and at least two other openings facing a fourth edge opposite the third edge.

The method may furthermore comprise application of the additional sealing material, forming a bridge between the lateral ends of the joint.

The additional sealing material may consist of the said sealing material, thus forming material continuity, preferably essentially organic, in particular epoxy resin.

Preferably, the width between the lateral ends of the joint may be at least 5 mm, for example 10 mm.

Other details and features of the invention will become apparent from the following detailed description, which is provided with reference to the appended drawings in which:

FIG. 6*bis* represents a schematic plan view of the multiple glazing with variable scattering by liquid crystals, showing in particular the sealing joint and the openings, in a variant of FIG. 6.

Figure 2:
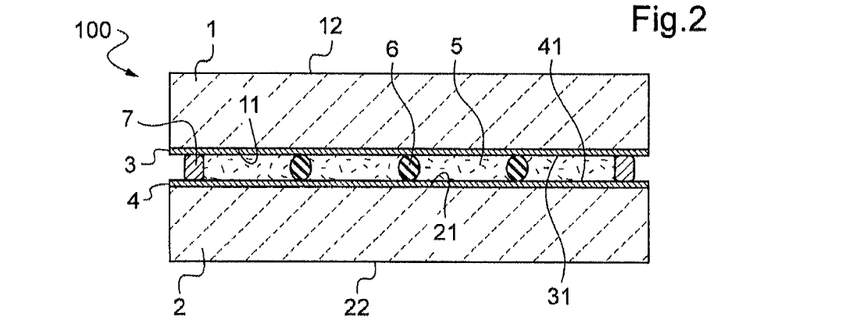
FIG. 2 represents a schematic sectional view of multiple glazing with variable scattering by liquid crystals in a first embodiment according to the invention.

The exemplary embodiment represented in FIG. 2 shows the design of the liquid-crystal multiple glazing according to the invention in a first embodiment.

On two sheets of float glass 1 and 1', electrically conductive layers 3, 4 with a thickness of about 20 to 400 nm, having external surfaces 21, 31 and made for example of indium tin oxide (ITO), are arranged on the internal faces 11, 21. The ITO layers have an electrical sheet resistance of between 5Ω/☐ and 300Ω/☐. Instead of layers made of ITO, other layers of electrically conductive oxide or layers of silver whose sheet resistance is comparable may also be used for the same purpose.

The layer 5 of liquid crystals, which may have a thickness of about 15 to 60 µm, is placed between the electrode layers 3 and 4.

The layer 5 of liquid crystals contains spherical spacers. The spacers 6 consist of a transparent hard polymer. For example, the product from Sekisui Chemical Co., Ltd, known by the designation "Micropearl SP" has proven highly suitable as a spacer.

In order to ensure uniformity of the thickness E of the liquid-crystal layer 5 and thus ensure the optical performance of the glazing with liquid crystals, glass panes 1, 1' with their electrodes 3, 4 are each selected with a dioptric defect score according to the invention, which score is measured by umbrascopy in reflection.

Figure 3:
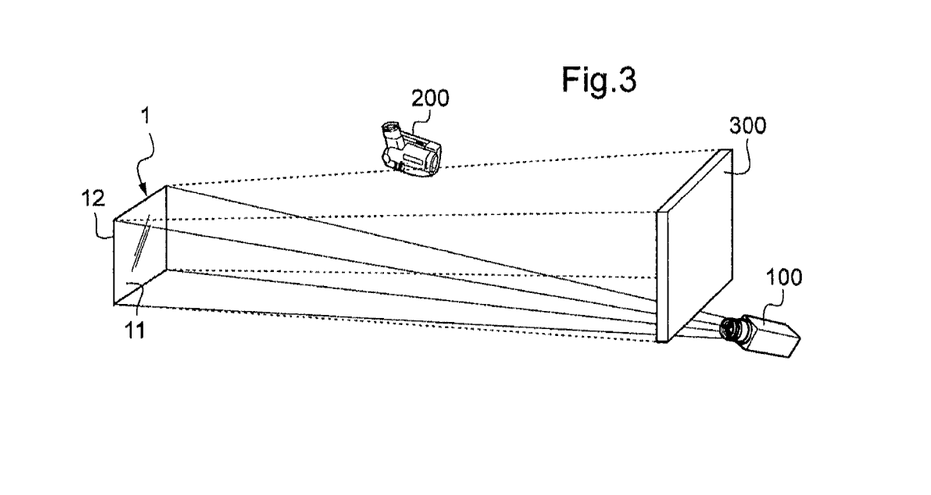
FIG. 3 shows the layout diagram of the measurement of the dioptric defect score.

The basic principle is associated with the geometrical optics. The diagram of the layout is represented in FIG. 3.

From a very thin source, such as a projector 100, a light flux is projected onto the face of the glass sheet 11 (coated or not with the electrode) intended to be the internal face. A projected image is observed on a screen 300 after reflection from the internal face 11 of the glass sheet. This image is acquired by a digital camera 200 in order to be processed. The reflection from the second face 12 is neutralized by using a wetted black fabric which is placed behind the glass pane 1 and on which the glass is bonded by capillary effect.

Figure 4:
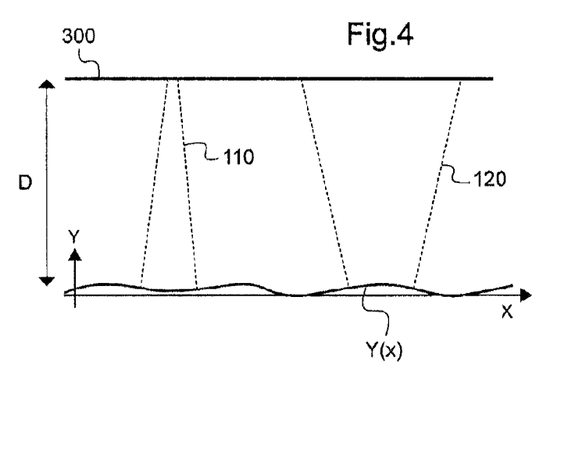
FIG. 4 shows the principle of the formation of an umbrascopic image on a screen on the basis of a planarity profile Y(x) of the glass.

FIG. 4 indicates the principle of the formation of an umbrascopic image on the screen 300 on the basis of a planarity profile Y(x) of the glass. A concave region on the glass pane (convergent defect) causes concentration of the incident reflected light 110 and therefore local over-illumination on the screen 300. A complex region on the glass (divergent defect) causes spreading of the incident reflected light 120 and therefore local under-illumination on the screen 300.

Figure 5:
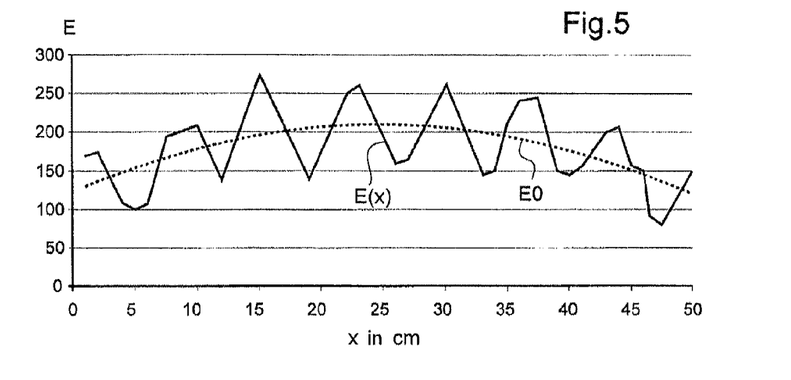
FIG. 5 shows an example of a local illumination profile E(x) and an average illumination profile E0($x$)

FIG. 5 shows an example of a local illumination profile E(x) and an average illumination profile E0($x$).

When the local illumination E(x) is equal to the average illumination E0($x$), the contrast is zero and consequently Y"(x)=0 and the optical power is zero.

When the local illumination E(x) is greater than the average illumination E0($x$), the contrast is negative and Y"(x)<0. A convergent defect is therefore involved, which corresponds to a concavity on the glass pane.

When the local illumination E(x) is less than the average illumination E0($x$), the contrast is positive and Y"(x)>0. A divergent defect is therefore involved, which corresponds to a convexity on the glass pane.

Knowing that the planarity variations are more significant in the direction of the overall width, in order to explain the operating principle of the apparatus we will consider a planarity profile in the plane perpendicular to the casting direction and perpendicular to the surface of the glass.

It can be shown on the basis of the laws of geometrical optics and conservation of energy that there is a relationship between the illumination E(x) measured on the screen corresponding to an abscissa point x on the glass pane and the profile Y(x) of the surface of the glass pane.

Certain geometrical simplifications made on the basis of the following aspects: the layout is in quasi-normal reflection and the source is considered to be a point source, give the following relationship:

$$\frac{d^2 Y(x)}{dx^2} = \frac{1}{D}\left(\frac{E_0}{E(x)} - 1\right)$$

with:
Y(x): profile of the glass pane
D: the glass pane—screen distance
$E_0$: average illumination at x (that which would be obtained without a planarity defect)
Let the optical reflection power ORP (in dioptres) be:

$$ORP = 2 \times \frac{d^2 Y(x)}{dx^2} \approx 2 \times \frac{C(x)}{D}$$

with the contrast C(x) such that $$C(x) = \frac{E_0 - E(x)}{E(x)}.$$

The contrast corresponds to the visual perception of the "linearity" (here in dashes because a profile rather than a surface is being considered) observed on the umbrascopic image projected onto the screen.

Processing software calculates the contrast, and therefore the optical reflection power ORP, for each pixel of the image.

The dioptric defect score (in millidioptres) reflects the homogeneity of the optical powers and is in fact the standard deviation σ of the distribution of the optical reflection powers over the internal face, defined by the relationship:

$$\sigma = \sqrt{\overline{(O.P.r^2)_{i,j}} - \overline{(O.P.r.)}^2_{i,j}}$$

with
$\overline{(O \cdot P \cdot r^2)_{i,j}}$: mean square of the optical powers over the entire internal face
$\overline{(O \cdot P \cdot r^2)_{i,j}}^2$: square of the mean of the optical powers over the entire internal face.

The score must be less than 12E/5 in order to ensure a sufficient optical quality in transmission, that is to say a good homogeneity of the light transmission in the "off" state.

By way of example, for a thickness E of 15 μm, with a standard float line having a capacity of 600 tonnes/day with a raw glass width of 3.5 m:
the score of the 2.1 mm glass is less than 22 mdt,
the score of the 3 mm glass is less than 11 mdt,
the score of the 4 mm glass is less than 8 mdt.

Furthermore, it is also possible to use known compounds for the layer of liquid crystals, for example the compounds described in Document U.S. Pat. No. 5,691,795. The liquid-crystal compound from Merck Co., Ltd, marketed under the brand name "Cyanobiphenyl Nematic Liquid Crystal E-31 LV" has also proven particularly suitable. In the case of this embodiment, this product is mixed in a ratio of 10:2 with a chiral substance, for example 4-cyano-4'-(2-methyl)butylbiphenyl, and this mixture is mixed in a ratio of 10:0.3 with a monomer, for example 4,4'-bisacryloylbiphenyl, and with a UV initiator, for example benzoin methyl ether. The mixture prepared in this way is applied onto one of the coated glass sheets. After curing of the layer of liquid crystals by irradiation with a UV light, a polymer network is formed in which the liquid crystals are incorporated.

As a variant, the layer of liquid crystals does not contain a stabilizing polymer but consists only of the compound comprising liquid crystals and spacers. The compound comprising liquid crystals is therefore applied as such without a monomer additive, with a thickness of from 3 to 20 μm onto one of the glass sheets 1, 1'. Compounds for liquid-crystal layers of this type are described, for example, in Document U.S. Pat. No. 3,963,324.

For the layer of liquid crystals, it is possible to use PDLCs such as the compounds 4-((4-ethyl-2,6-difluorophenyl)-ethinyl)-4'-propylbiphenyl and 2-fluoro-4,4'-bis(trans-4-propylcyclohexyl)-biphenyl, for example marketed by the company Merck under the reference MDA-00-3506.

On the edge, the layer of liquid crystals is sealed by an adhesive sealing joint 5 which simultaneously serves to firmly and permanently bond the glass sheets 1, 1'.

The adhesive sealing material which seals the separate glass sheets 1 and 1' on their edges contains an epoxy resin.

Figure 6:
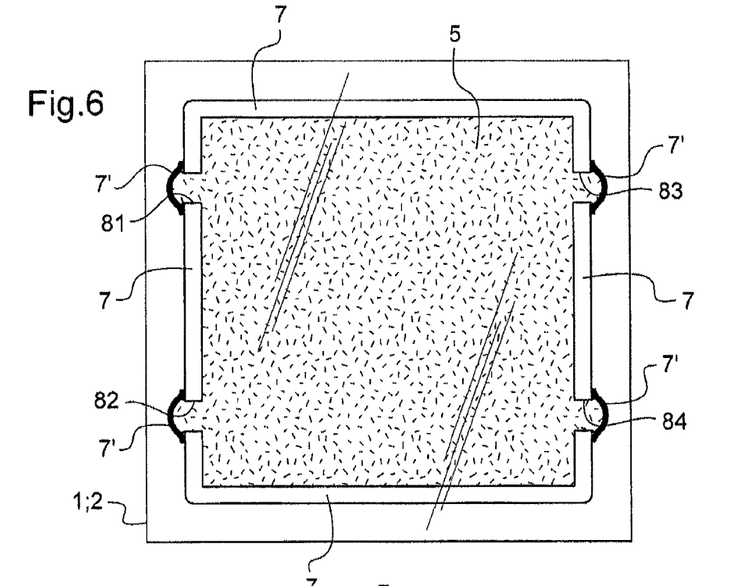
FIG. 6 represents a schematic view from below of multiple glazing with variable scattering by liquid crystals according to the invention, showing in particular the sealing joint and the openings.

As shown in FIG. 6, the sealing joint has a given width L and is interrupted in its width by a plurality of openings 81 to 84, each defining lateral joint ends 71 to 74'.

More precisely, the sealing joint 7 is interrupted in its width by two openings 81 to 82 facing a first edge of the glazing and by two other openings 83, 84 facing a second edge opposite to the first edge, these edges corresponding to the edges of the assembly direction of the glass panes, preferably by calendering.

For each opening, an additional sealing material 7' forms a bridge between the adjacent lateral ends of the joint, in particular consisting of the said sealing material, thus forming material continuity as shown in FIG. 6*bis*.

In the initial state ("off" state), that is to say before the application of an electrical voltage, this liquid-crystal glazing 100 is translucent, that is to say it optically transmits but is not transparent. As soon as the current is connected up, the layer of liquid crystals changes under the effect of the alternating electric field into the transparent state, that is to say the state in which viewing is no longer prevented.

The electrically controllable glazing with liquid crystals is produced by using a method described in detail below.

In an industrial installation for continuous coating, by using the method of magnetic field enhanced reactive sputtering, float glass sheets according to the invention are coated in successive sputtering chambers with a layer of ITO having an approximate thickness of 100 nm.

Two separate glass sheets of the same size and having the desired dimensions are cut from a large sheet of glass coated in this way and are prepared for continuation of the processing.

The two separate glass sheets cut to the desired dimensions then firstly undergo a washing operation.

The liquid-crystal layer mixed with the spacers is then applied onto one of the two glass sheets processed in this way.

Since the two separate glass sheets are subsequently connected permanently and closely to one another on their edges by a sealing joint, the edge part of the glass sheet 1 is not coated over a width of about 2 to 10 mm.

The coating with the liquid-crystal compound is carried out with the aid of an operation referred to as drop-by-drop filling. In order to carry out the operation, a drop-by-drop pouring apparatus is used which makes it possible to deposit drops of liquid crystals onto a glass substrate, the quantity poured being finely adjustable.

In another embodiment of the method, in order to print the layer of liquid crystals, a screen printing fabric is used with a mesh the width of which is about 20 to 50 μm and the thread diameter of which is about 30 to 50 μm.

The adhesive layer forming the joint 7 is likewise applied directly along the edge of the glass sheet 24 before or after deposition of the layer of liquid crystals. It may have a width of, for example, from 2 to 10 mm.

Figure 7:
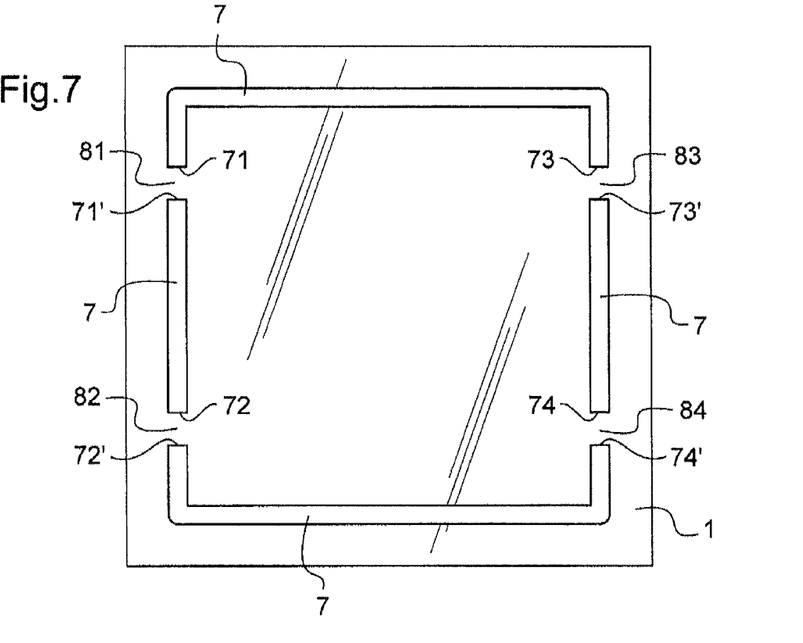
FIG. 7 represents a schematic plan view of the manufacture of the multiple glazing with variable scattering by liquid crystals according to the invention, showing in particular the sealing joint and the openings.

As shown by FIG. 7, the formation of a plurality of openings 81 to 84 in the sealing joint is provided, with a size and distribution adapted to remove the excess liquid-crystal layer, the openings 81 to 84 each defining two adjacent lateral ends 71 to 74' of the joint 7.

Furthermore, in order to do this, the application of the sealing material is either discontinuous or is continuous then followed by creation of openings (by removing material 7).

This is followed by application of the additional sealing material 7' forming a bridge between the lateral ends of the joint 71 to 74', preferably consisting of the said sealing material, thus forming sealing material continuity.

When the two separate glass sheets have thus been pressed against one another, the adhesive layer 7 is compressed to the thickness E of the layer of liquid crystals.

The openings 81 to 84 therefore serve:
- to remove the excess liquid-crystal layer, and therefore to better control the layer thickness and thus avoid a loss of optical quality,
- to degas the layer of liquid crystals in order to avoid the subsequent formation of bubbles in the layer and thus again to avoid a loss of optical quality.

At least two openings are preferably positioned on the front edge of the calendering and at least two openings on the rear edge of the calendering.

The width of the lateral ends is, for example, 10 mm. The more viscous the layer of liquid crystals is, the greater is the number of openings used.

The calendering operation is subsequently carried out, or as a variant the pressing.

If the layer of liquid crystals consists of a mixture of liquid crystals and a monomer, the polymerization operation is then carried out by irradiation with UV light.

The invention claimed is:

1. A multiple glazing with variable scattering by liquid crystals comprising:
   first and second flat float glass sheets sealed on the edge of their internal faces by a sealing joint;
   on the internal faces of the first and second glass sheets, first and second electrodes in the form of transparent electrically conductive layers provided with a power supply;
   on the first and second electrodes, a layer of liquid crystals adapted to alternate reversibly between a transparent state and a translucent state by application of an alternating electric field, which layer has an average thickness E from 15 to 60 μm and incorporates spacers,
   wherein a thickness of each of the first and second glass sheets is less than or equal to 5.5 mm, and
   wherein each of the internal faces coated with the first and second electrodes has a dioptric defect score, expressed in millidioptres, of less than 12E/15 where the thickness E of the liquid crystals is in μm.

2. The multiple glazing with variable scattering by liquid crystals according to claim 1, wherein for a thickness E of less than 30 μm, the thickness of the first glass sheet and the second glass sheet lies from 3 mm to 5.5 mm,
   and
   for a thickness E greater than or equal to 30 μm, the thickness of the first glass sheet and the second glass sheet lies from 2 mm to 5.5 mm.

3. The multiple glazing with variable scattering by liquid crystals according to claim 1, wherein the sealing joint has a width and is interrupted in its width by a plurality of openings each defining lateral joint ends, and wherein for each opening an additional sealing material forms a bridge between the lateral ends of the joint, thus forming material continuity.

4. The multiple glazing with variable scattering by liquid crystals according to claim 3, wherein the sealing joint is interrupted in its width by at least two openings facing a first edge of the glazing and by at least two other openings facing a second edge opposite the first edge.

5. The multiple glazing with variable scattering by liquid crystals according to claim 1, wherein the sealing joint and/or an additional sealing material is essentially organic.

6. A method comprising arranging the multiple glazing with variable scattering by liquid crystals according to claim 1 as glazing in vehicles or buildings.

7. A method for producing multiple glazing with variable scattering by liquid crystals according to claim 1, comprising:
   forming the sealing joint, said forming comprising applying the sealing material on the first float glass sheet provided with the first electrode;
   liquid depositing the layer of liquid crystals with an average thickness E on the first float glass sheet provided with the first electrode and optionally on the second float glass sheet provided with the second electrode;
   after forming the sealing joint and depositing the layer of liquid crystals, bringing the first and second glass sheets in contact; and
   before bringing the first and second glass sheets in contact, forming the plurality of said openings of the sealing joint each defining the lateral ends of the joint.

8. The method for producing multiple glazing with variable scattering by liquid crystals according to claim 7, wherein the sealing joint is interrupted in its width by at least two openings facing a first edge of the glazing and by at least two other openings facing a second edge opposite the first edge, and wherein the assembly of the first and second glass sheets is carried out by calendering, the first and second edges corresponding to the edges in the direction of calendering.

9. The method for producing multiple glazing with variable scattering by liquid crystals according to claim 8, wherein the assembly of the first and second glass sheets is carried out by pressing, wherein the sealing joint is interrupted in its width by at least two openings facing a third edge of the glazing adjacent to the first edge and by at least two other openings facing a fourth edge opposite the third edge.

10. The method for producing multiple glazing with variable scattering by liquid crystals according to claim 7, comprising applying the additional sealing material, forming a bridge between the lateral ends of the joint.

11. The method for producing multiple glazing with variable scattering by liquid crystals according to claim 10, wherein the additional sealing material consists of said sealing material, thus forming material continuity.

12. The multiple glazing with variable scattering by liquid crystals according to claim 5, wherein the sealing joint and/or the additional sealing material is made of epoxy resin.

13. The method for producing multiple glazing with variable scattering by liquid crystals according to claim 11, wherein the additional sealing material is made of epoxy resin.

14. A multiple glazing comprising:
- first and second glass sheets each having a face sealed on an edge thereof by a sealing joint;
- first and second electrodes arranged respectively on the face of the first and second glass sheets, each of the first and second electrodes including an electrically conductive layer provided with a power supply;
- a layer of liquid crystals arranged on the first and second electrodes and adapted to alternate reversibly between a transparent state and a translucent state when an alternating electric field is applied, the layer having an average thickness E from 15 to 60 μm and incorporating a plurality of spacers,
- wherein a thickness of each of the first and second glass sheets is less than or equal to 5.5 mm, and
- wherein each of the faces coated, respectively, with the first and second electrodes has a dioptric defect score, expressed in millidioptres, of less than 12E/15 where the thickness E of the liquid crystals is in μm.

* * * * *